United States Patent
Gazyakan

[11] Patent Number: 5,743,147
[45] Date of Patent: Apr. 28, 1998

[54] GEAR SHIFT DEVICE

[75] Inventor: Ünal Gazyakan, Friedrichshafen, Germany

[73] Assignee: ZF Friedrichshafen AG, Friedrichshafen, Germany

[21] Appl. No.: 656,341

[22] PCT Filed: Dec. 10, 1994

[86] PCT No.: PCT/EP94/04107

§ 371 Date: Jun. 14, 1996

§ 102(e) Date: Jun. 14, 1996

[87] PCT Pub. No.: WO95/16869

PCT Pub. Date: Jun. 22, 1995

[30] Foreign Application Priority Data

Dec. 16, 1993 [DE] Germany ............................ 43 42 957.2

[51] Int. Cl.$^6$ ............................................................ F16H 63/36
[52] U.S. Cl. ............................................ 74/477; 74/473 R
[58] Field of Search .................................. 74/473 R, 477

[56] References Cited

U.S. PATENT DOCUMENTS 3,513,717  5/1970  Lickey et al. ............................ 74/477

FOREIGN PATENT DOCUMENTS

| 393021 | 10/1908 | France ............................ 74/477 |
| 293488 | 8/1915 | Germany . |
| 58-189716 | 11/1983 | Japan ............................ 74/477 |
| WO93/10377 | 5/1993 | WIPO . |

OTHER PUBLICATIONS

Patent Abstracts of Japan vol. 8, No. 33 (P–254) 14. Feb. 1984 & JP.A.58 189 716 (Mitsubishi Jidosha) 5. Nov. 1983.

*Primary Examiner*—Allan D. Herrmann
*Attorney, Agent, or Firm*—Davis and Bujold

[57] ABSTRACT

A gearshift device for gearshift actuation of multi-speed transmissions of vehicles is provided with at least one gearshift rod situated in the transmission housing and movable in substantially parallel direction to the wheel axis. Coupling means situated on said gearshift rod join the gearshift rod with gearshift forks or levers. The gearshift forks (13) or levers (9) are retained in the neutral position relative to the gearshift rod (2) in the transmission housing (1) by retaining means, the gearshift rod (2) being axially movable relative to the gearshift levers (9) or forks (13) and for shifting gears a correspondingly selected coupling means (3) may be joined by a driving device (6) to the gearshift rod (2) in a rigid manner at least in axial direction.

11 Claims, 6 Drawing Sheets

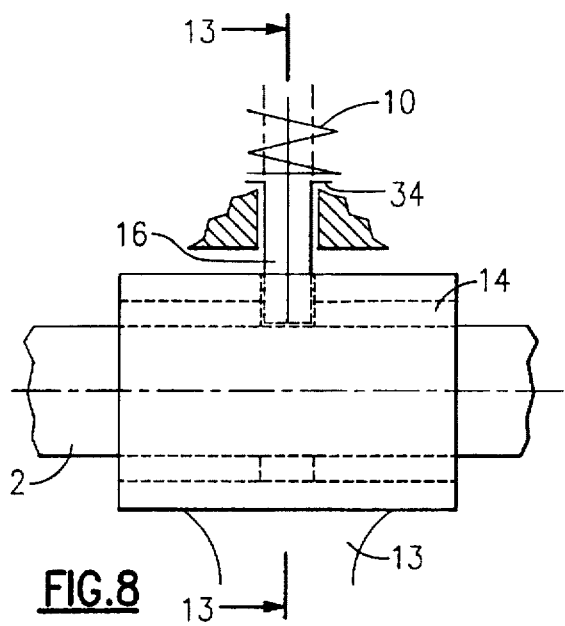
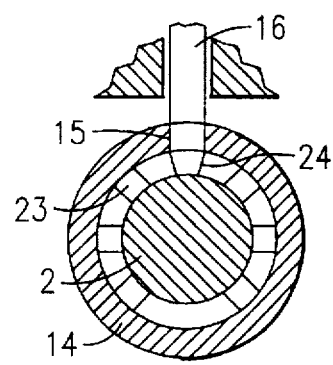
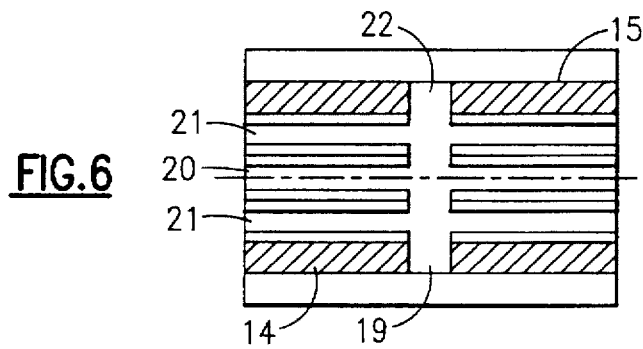
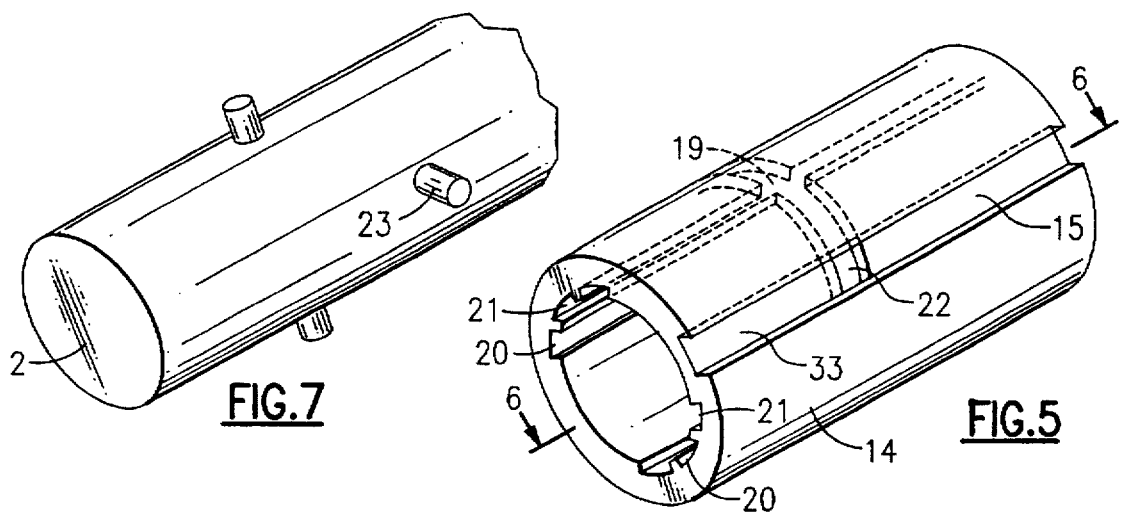

GEAR SHIFT DEVICE

The invention concerns a gearshift device for gearshift actuation of multi-speed transmissions according to the preamble of claim 1.

Already known are locking devices which interlock fork-shaped gearshift elements in order to prevent an erroneous function, that is, inadvertent simultaneous engagement of two gears, which unquestionably causes damage or absolute destruction of the transmission.

Such a locking device for a single gearshift rod upon which several gearshift levers are situated has been described in DE 40 17 957. Here, rocking arms are provided as locking elements which prevent movements of the gearshift levers when they mesh via locking cams in locking grooves existing on each gearshift lever.

However, in said publication it is not described how to control or select the respective gearshift lever needed for engaging the desired gear or how this mechanism precisely functions. It is only mentioned that the gearshift levers are moved according to a turning and axial movement of the gearshift rod.

The best known transmissions have several gearshift rods for selecting or controlling a specific gearshift lever or fork. But such an arrangement has the disadvantage of requiring much space and the assembly is complicated and thus expensive.

Therefore, this invention is based on the problem of developing the prior art in a manner that is simple, inexpensive and reliable and especially in which only a single gearshift rod is needed for gearshifting.

According to the invention, said problem is solved by the features stated in the characteristic part of claim 1.

The solution proposed by the invention makes possible, in a practically simple manner, the realization of a gearshift device that rules out any operating error or malfunction, that saves space and that can be very easily and economically assembled and disassembled.

Advantageous developments and embodiments of the invention result from subclaims 2 to 13 and from the following description with reference to the drawing of an embodiment. In the drawings:

FIG. 5 is a perspective view of a basic member of a coupling means;

FIG. 6 is a longitudinal section through the basic member of a coupling means along line 6—6 in FIG. 5;

FIG. 7 is a gearshift rod with several driving elements;

FIG. 8 is a view of the basic member of the coupling means with the gearshift rod;

FIG. 10 to 12 show a longitudinal section through the retaining means diagrammatically showing the selection of a gearshift fork or gearshift lever and FIG. 13 is a section through the basic member of a coupling means along line 13—13 of FIG. 8.

FIG. 1 and 2 show a first embodiment of the gearshift device according to the invention which is adequate only for use with gearshift levers.

Figure 1:
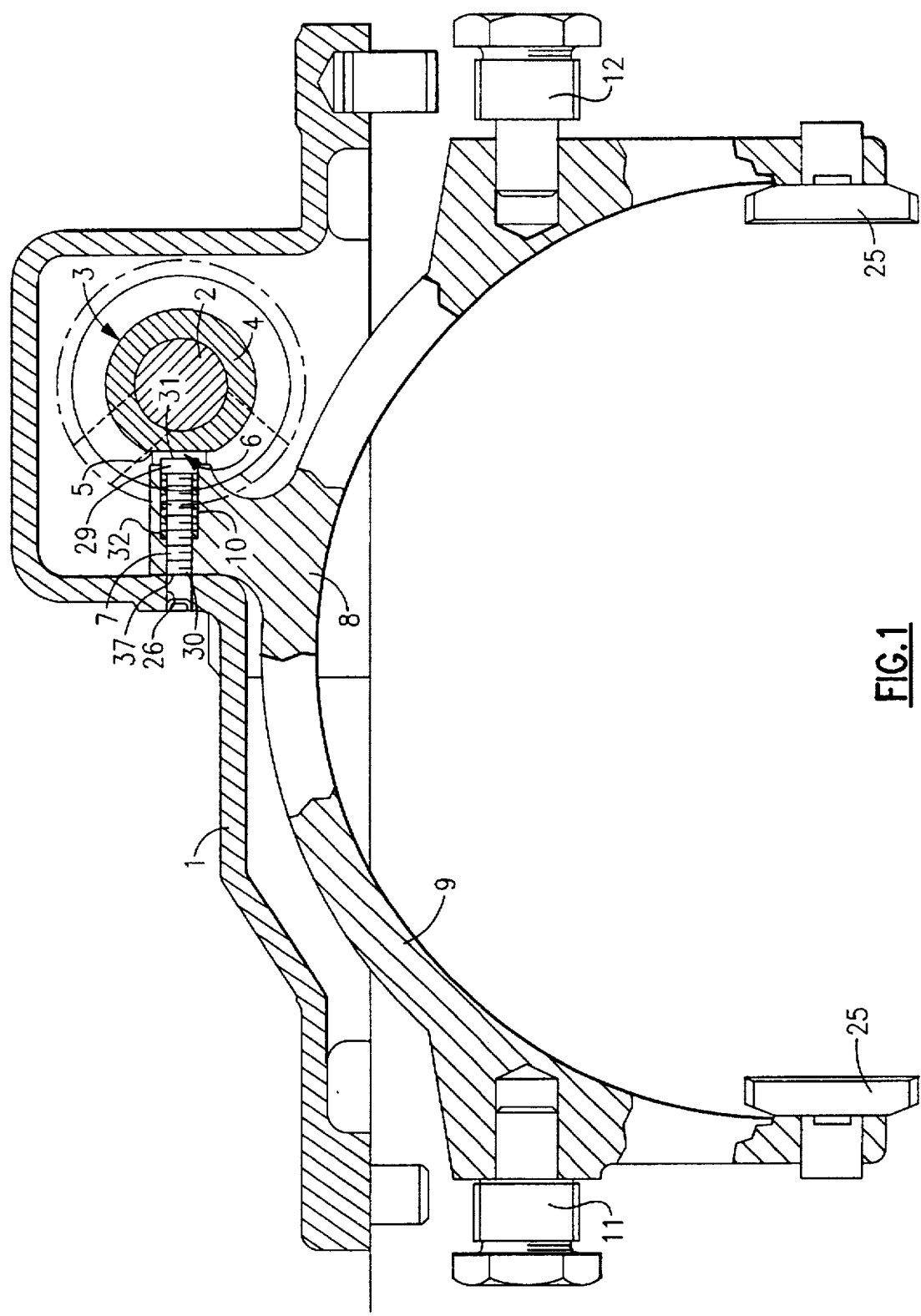
FIG. 1 is a section through a transmission housing with a gearshift device according to the invention following line 1—1 of FIG. 2.

Referring to FIG. 1 a section is shown through a gearshift device according to the invention.

A gearshift rod 2 is rotatably and axially movably supported in a transmission housing 1. Upon the gearshift rod 2, a coupling means 3 is firmly supported which has a sleeve-shaped basic member 4 where a groove 5 is made extending perpendicularly to the longitudinal axis of the basic member 4. A stop bolt 7, under the action of a stressing spring, is movably supported in the top portion 8 of a gearshift lever 9. Said stressing spring is designed as compression spring 10. At the indicated place, the stop bolt 7 is urged by the compression spring 10 against the surface of the groove. The gearshift lever 9 is rotatable in relation to the transmission housing 1. For this purpose, the gearshift lever 9 is supported in the transmission housing 1 tiltably about two bolts 11, 12.

When the gearshift rod 2 and therewith the sleeve-shaped basic member 4 rotate, the stop bolt 7 is displaced to the left—with reference to the drawing—by the surface of the groove 5 against the force of the compression spring 10. This axial displacement produces a sinking of the free (left) end of the stop bolt 7 into a bore 26 of the transmission housing. The axial displacement movement terminates when the stop bolt 7 abuts on the periphery of the sleeve-shaped basic member 4. The free end of the stop bolt 7 is then completely sunk into the bore 26. The process explained causes the gearshift lever 9 to lock on the transmission housing 1.

Figure 2:
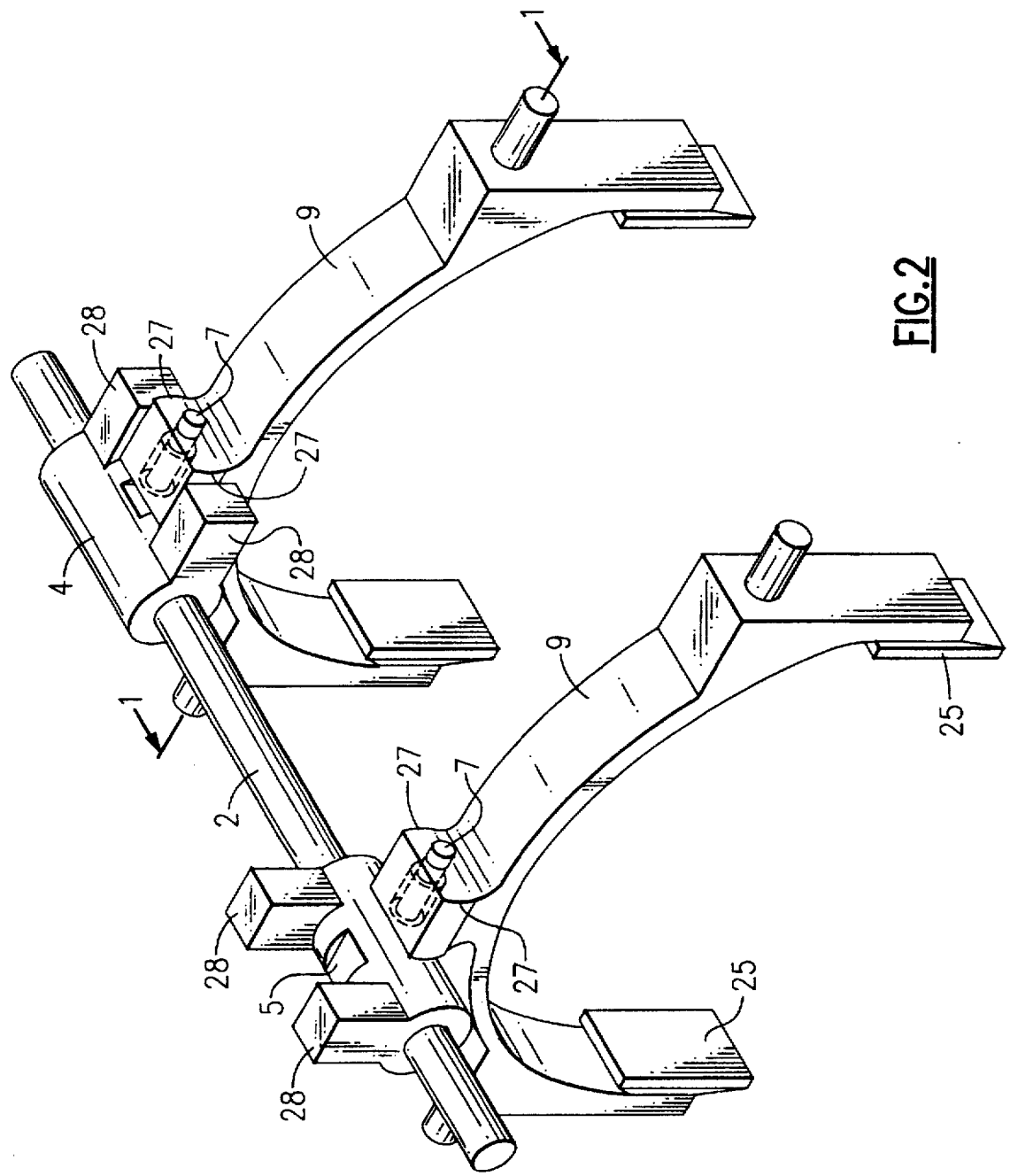
FIG. 2 is a perspective view of the gearshift device of FIG. 1.

FIG. 2 shows in perspective the arrangement already described.

The groove 5 worked in the basic member 4 and the abutting stop bolt 7 in this representation can be seen specially well. The arrangement of several gearshift levers 9 on a single gearshift rod 2 is also to be clearly seen, the same as the offset grooves 5 which respectively extend only over part of the peripheral area of each basic member of the individual basic member 4.

This angular offset, where each one of the intrinsically equal basic members 4 is situated on the gearshift rod 2 offset by a specific angle relative to the groove 5, has the effect that consistently only one specific gearshift lever 9 is selected and actuated.

The selection of a specific gearshift lever 9 with the gearshift device proposed by the invention operates as follows:

As result of the rotation of the gearshift rod 2 about a specific angle having a measure which depends on the gear to be engaged, that is, which gearshift lever 9 is to be actuated, the stop bolt 7 is urged by the prestressed compression spring 10 against the surface of the groove 5 of the corresponding basic member. This is the case with the gearshift lever 9 lying to the right in the drawing. The stop bolt 7 has left the bore 26 provided in the transmission housing. Upon rotation of the gearshift rod 2, two slightly convex bearing surfaces 27 in the top portion 8 of the gearshift lever 9 sink between two drivers 28 of the basic member 4. The bearing surfaces 27 and the drivers 28 of the basic member 4 form a driving device 6 completed by the groove 5 and the stop bolt 7. The stop bolt 7 is slidably inserted into the lever bore 37 and has a first end 29 located adjacent the basic member while a second end 30 is removably inserted into the transmission housing to define the slide position of the coupling mechanism. One end of the spring 10 is captively retained by a head 31 of the stop bolt while the other end of the spring 10 is retained by a shoulder 32 formed on an interior surface of the lever bore 37.

If the gearshift rod 2 is now moved in axial direction, the gearshift levers 9 turn about the axis of rotation defined by the bolts 11, 12 and thus carry out in a manner known a change of gear per se via fulcrum pads 25.

If another gear is to be engaged, the gearshift rod 2 is again turned about a specific angle. The stop bolt 7 is axially moved by the surface of the groove 5 against the compression spring 10 and sinks into the bore 26 provided in the transmission housing. Thereby the gearshift lever 9 is retained in the transmission housing 1. In this operation the drivers 28 leave the bearing surfaces 27 of the gearshift lever 9 and point upwards, as can be seen in the example of the gearshift lever lying to the left in FIG. 2. The gearshift lever 9 is locked in the transmission housing and an axial movement of the gearshift rod 2 has no effect upon said gearshift lever. In another gearshift lever, the stop bolt 7 is urged against the surface of the groove 5 of the sleeve-shaped basic member 4. The stop bolt 7 leaves the bore 26 of the transmission housing 1. In this process the slightly convex bearing surfaces 27 sink into the intermediate space between the drivers 28.

The gearshift rod 2 with the basic members 4 firmly mounted thereon can be produced either in one piece by a cutting process, or the gearshift 2 and the basic member 4 can be separately produced and then joined with each other by an adequate jointing process such as welding, glueing or soldering.

A second embodiment of the gearshift device according to the invention which can interact both with gearshift forks and with gearshift levers is shown in FIG. 3 to 14. For parts already described and having the same function already described, the same reference numerals as in FIG. 1 and 2 have been used.

Figure 3:
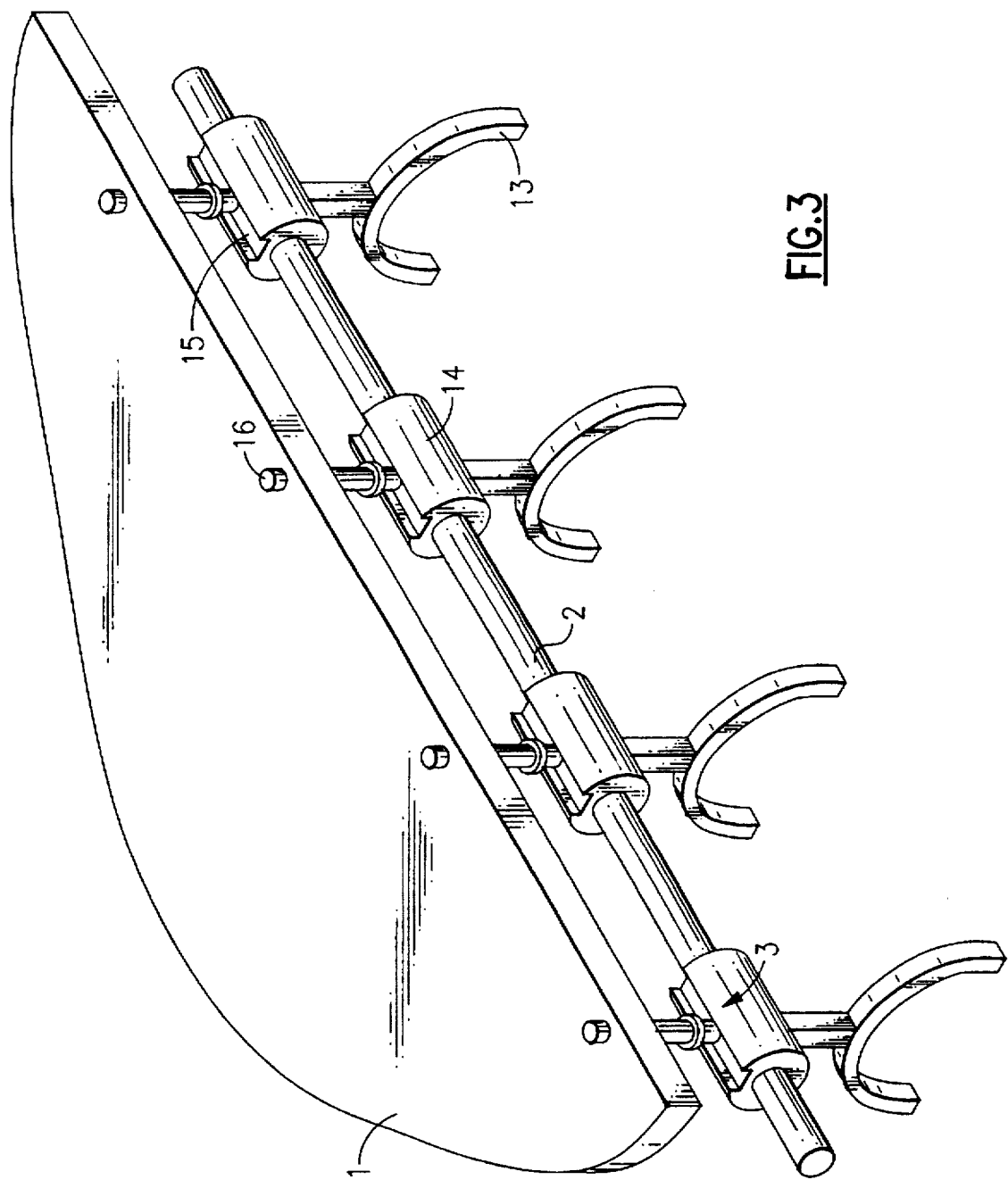
FIG. 3 is a perspective view of a second embodiment in a design with gearshift forks.
Figure 4:
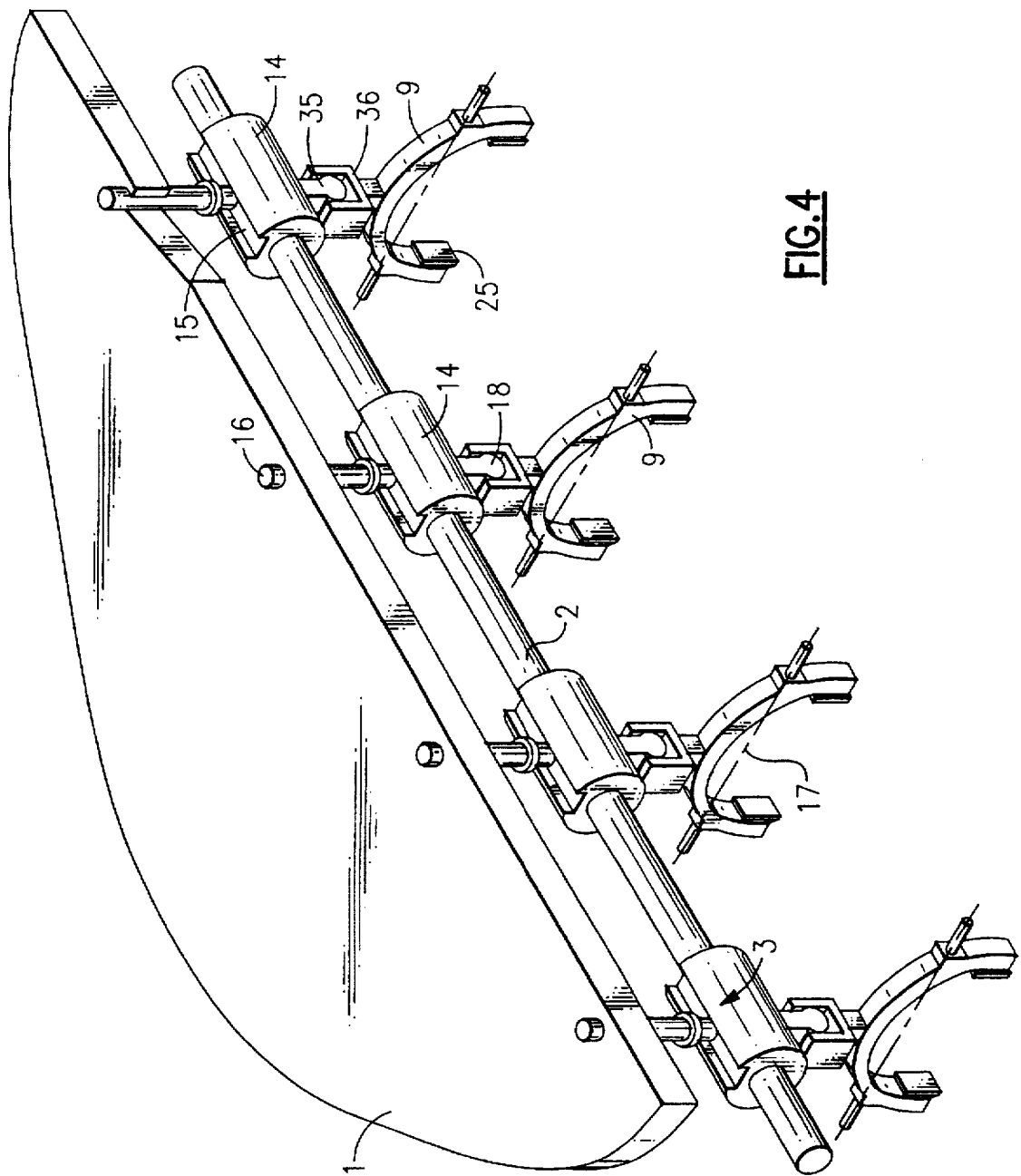
FIG. 4 is a perspective view of the embodiment of FIG. 3 in a design with gearshift levers.

With reference to FIG. 3 and 4, they show the possible embodiments with gearshift forks (FIG. 3) and with gearshift levers (FIG. 4).

FIG. 3 shows a single gearshift rod 2 upon which several coupling means 3 are situated. Directly beneath the coupling means 3 and firmly connected therewith there are disposed gearshift forks 13 which always move together with the coupling means 3.

The coupling means 3 have a cylindrical basic member 14 with a longitudinal groove 15 on top. The coupling means 3, that is, the cylindrical basic member 14, sits axially movably on the gearshift rod 2. Stop bolts 16 are pressed by compression springs 10 into the longitudinal groove 15.

According to FIG. 4 the gearshift levers 9 can rotate about an axis of rotation 17 and change the gear in a transmission, not shown, at the same time said gearshift levers 9 being connected by an intermediate joint 18 to the corresponding coupling means 3. By the intermediate joint 18, the axial movement of the gearshift rod 2 or of the basic member 14 is converted to a swiveling movement of the fulcrum pads 25 of the gearshift levers 9. The intermediate joint comprises a ball portion 35, extending from the basic member 14, and a complementary shaped socket portion 36, attached to the gearshift levers 9, for receiving the ball portion 35.

FIG. 5 show the cylindrical basic member 14 in perspective view in enlarged separate illustration.

In addition to the longitudinal groove 15, the cylindrical basic member 14 has on its inner side another annular groove 19 and several pairs of axially extending grooves, one pair always consisting of two grooves facing each other. One pair of said grooves is designated by the reference numerals 20 and 21. The longitudinal groove 15 is connected on one point with the annular groove 19 by an aperture 22 which results from the annular groove 19 and the longitudinal groove 15 intersecting on said point and the tolerances of both grooves producing the aperture. The longitudinal groove 15 is provided with a floor 33.

FIG. 6 shows a longitudinal section through the cylindrical basic member 14 in which again are clearly shown the longitudinal groove 15, the annular groove 19, the aperture 22 and one respective groove of the grooves axially extending in pairs.

FIG. 7 shows in perspective the gearshift rod 2.

Upon the gearshift rod 2 are situated driving elements 23 which in the embodiment according to the invention are designed as studs and are each offset by 45° on the peripheral area of the gearshift rod 2. Studs lying opposite each other are here disposed in a manner such that the longitudinal axes of the studs are coaxial. Studs lying diametrically opposite each other can also be replaced by pins extending diagonally through the gearshift rod 2, the ends of the pins respectively projecting from the gearshift rod 2. The driving elements 23 are here dimensioned so as to be passed into the pairs of axially extending grooves 20, 21 and into the annular groove 19 in the cylindrical basic member 14 (see FIG. 5) and be movable parallel to the longitudinal axis of the gearshift rod 2 or rotatable about the longitudinal axis thereof.

FIG. 8 shows a sideview of the cylindrical basic member 14 with the gearshift fork 13 (shown only in part) mounted thereon, the gearshift rod 2 and the stop bolt 16 which as result of the prestressed compression spring 10 positively into the longitudinal groove 15, not to be seen in this view, on the top side of the cylindrical basic member 14. The dimensions of the longitudinal groove 15 and the stop bolt 16 are here such that the stop bolt 16 is inserted into the longitudinal groove. One end of the spring 10 is captively retained by the transmission housing 1 while the other end is captively retained by an annular keeper 34 provided on the stop bolt 16.

Figure 9:
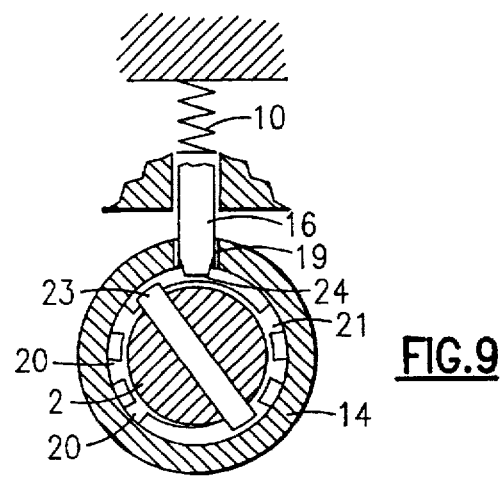
FIG. 9 is a section along line 9—9 of FIG. 10 through the basic member of the coupling means.

In FIG. 9 is shown an intermediate position of the gearshift rod 2 of the gearshift device proposed by the invention. The stop bolt 16 urges into the longitudinal groove 15 in the cylindrical basic member 14. The grooves 20, 21 axially extending in pairs are also to be clearly seen. The driving elements 23 on the gearshift rod 2 mesh with the grooves 20, 21 axially extending in pairs.

Figure 10:
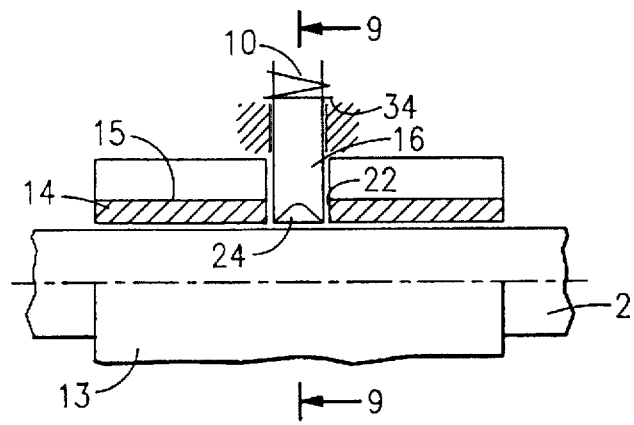
Figure 11:
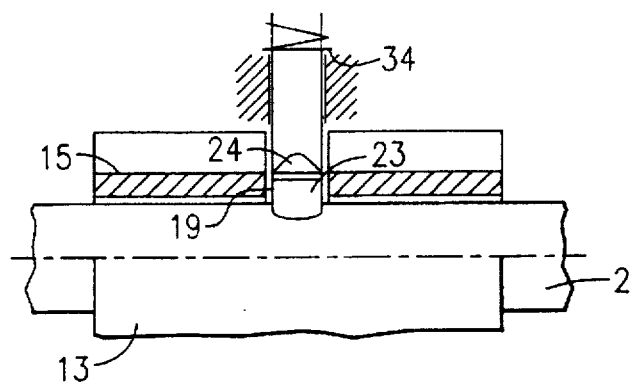
Figure 12:
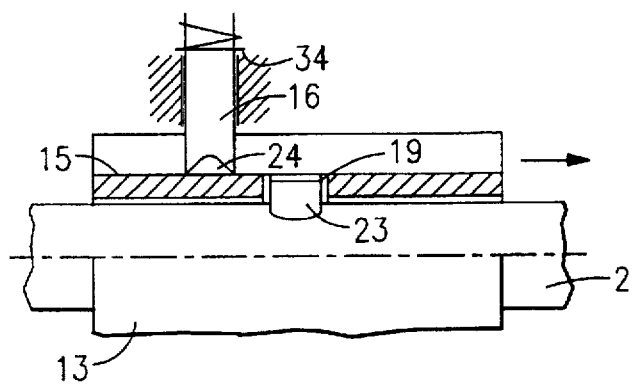

A change of gear is shown in FIG. 10 to 12. In the normal position (FIG. 10) the stop bolt 16 sits in the longitudinal groove 15 and the aperture 22, and the driving elements (not shown) of the gearshift rod 2 are in the annular groove (not to be seen here). Due to the rotation of the gearshift rod 2 by a defined angle which depends on the gear which is to be engaged, the driving elements 23 fastened on the gearshift rod 2 also rotate and according to the angular position, on precisely one of the cylindrical basic members 14 upon the gearshift rod 2, the stop bolt 16 is lifted from the aperture 22 so far only as to be passed again into the longitudinal groove 15 (FIG. 11). Which one of the cylindrical basic bodies 14 to select depends on the gear that is to be engaged.

As a result of the operation described, the driving element 23 no longer meshes with an axial groove 20 or 21 but now abuts the annular groove 19 on a groove wall (see FIG. 9). If the gearshift rod 2 is now linearly moved in axial direction, the cylindrical basic member 14 moves along. During the process of axial movement in the longitudinal groove 15 (FIG. 12), the stop bolt 16 of the selected cylindrical basic member 14 slides while all the other cylindrical basic members placed on the gearshift rod 2 are retained by their respective stop bolts and the gearshift rod 2 slides through beneath them, it being possible for the driving elements 23 of the gearshift rod 2 coordinated with them to slide through the grooves 20 and 21.

To simplify the gearshift operation, the stop bolt 16 is provided on its side 24 facing the driving element 23 with a chamfer or bevel so that it can be easily moved upward by the driving element 23 during the rotation movement thereof about the longitudinal axis of the gearshift rod 2.

If another gear is now to be engaged, the gearshift rod 2 and thus also the cylindrical basic member 14 with the gearshift forks or gearshift levers situated thereon are axially moved away from the position last described until the stop bolt 16 is again precisely over the annular groove 19, that is, also precisely over the aperture 22. If the gearshift rod 2 is now turned about a defined angle, the stop bolt 16 again locks in the aperture 22 and the cylindrical basic member 14 is again in its normal position and locked opposite the housing 1 so that the gearshift rod 2 can slide under it during an axial movement, since at the same time the driving element 23 lies also before the axial groove 20 or 21.

FIG. 13 shows for clarification a section along the line XIII—XIII of FIG. 8. In the upper area is clearly to be seen the connection between the longitudinal groove 15 and the annular groove 19, that is, the aperture 22, and likewise the gearshift rod 2 with the driving elements 23.

Reference numerals
1 transmission housing
2 gearshift rod
3 coupling means
4 sleeve-shaped basic member
5 groove in the basic member
6 driving device
7 stop bolt
8 upper part of the gearshift lever
9 gearshift lever
10 compression spring
11 bolt
12 bolt
13 gearshift fork
14 cylindrical basic member
15 longitudinal groove
16 stop bolt
17 axis of rotation
18 intermediate joint of the gearshift lever
19 annular groove
20 pair of axially extending grooves
21 pair of axially extending grooves
22 aperture
23 driving element
24 side of the stop bolt
25 fulcrum pad
26 bore
27 bearing surface
28 driver

I claim:

1. A gearshift device, for gearshift actuation of a multi-speed transmission, comprising:
 a transmission housing;
 a gearshift rod being slidably and rotatably mounted to the transmission housing and having a longitudinal axis, the gearshift rod being slidable along and rotatable about the longitudinal axis;
 a plurality of gearshift mechanisms being movable between a disengaged position and an engaged position;
 each of said gearshift mechanisms having a coupling mechanism for coupling the gearshift mechanism to the gearshift rod, each coupling mechanism being adjustable between a slide position and a drive position such that when the coupling mechanism is in the slide position the gearshift rod is slidable relative to the gearshift mechanism, and when the coupling mechanism is in the drive position the gearshift rod is secured to the gearshift mechanism and translational movement of the gearshift rod along the longitudinal axis causes the corresponding gearshift mechanism to move to one of the engaged and disengaged positions; and
 the gearshift mechanisms being gearshift levers rotatably mounted to the transmission housing about a second axis oriented perpendicular to the longitudinal axis of the gearshift rod;
 wherein each coupling mechanism comprises:
 a sleeve-shaped basic member secured about the gearshift rod and having a center along the longitudinal axis;
 a groove is provided in a peripheral surface of the basic member;
 a bore is provided through a top portion of the gearshift lever and is alignable with the groove in the basic member, and the top portion is in sliding communication with the basic member;
 a stop bolt is slidably inserted into the bore and has a first end adjacent the basic member and a second end removably inserted into the transmission housing to define the slide position of the coupling mechanism; and
 a biasing mechanism for biasing the stop bolt towards the basic member and, when the groove in the basic member and the bore in the top portion are aligned with one another, the biasing mechanism urges the first end of the stop bolt into the groove and removes the second end of the stop bolt from the transmission housing to define the drive position of the coupling mechanism.

2. A gearshift device according to claim 1, wherein the biasing mechanism is a coil spring which has one end captively retained by a head of the stop bolt and the other end captively retained by a shoulder formed on an interior surface of a lever bore.

3. A gearshift device according to claim 1, wherein the grooves of the basic members are radially offset from one another such that, throughout a full rotational and longitudinal movement of the gearshift rod, only one coupling mechanism is able to be in the drive position.

4. A gearshift device, for gearshift actuation of a multi-speed transmission, comprising:
 a transmission housing;
 a gearshift rod being slidably and rotatably mounted to the transmission housing and having a longitudinal axis, the gearshift rod being slidable along and rotatable about the longitudinal axis;
 a plurality of gearshift mechanisms being movable between a disengaged position and an engaged position;
 each of said gearshift mechanisms having a coupling mechanism for coupling the gearshift mechanism to the gearshift rod, each coupling mechanism being adjustable between a slide position and a drive position such that when the coupling mechanism is in the slide position the gearshift rod is slidable relative to the gearshift mechanism, and when the coupling mechanism is in the drive position the gearshift rod is secured to the gearshift mechanism and translational movement of the gearshift rod along the longitudinal axis causes the corresponding gearshift mechanism to move to one of the engaged and disengaged positions; and
 the gearshift mechanisms being gearshift forks rigidly secured to the coupling mechanisms;

wherein each coupling mechanism comprises:

a cylindrical basic member which is slidably mounted on the gearshift rod and has a center along the longitudinal axis;

a longitudinal groove, with a floor provided therein, is provided on an outer surface of the basic member;

a stop bolt is slidably mounted in the transmission housing and has a first end which abuts against the floor of the longitudinal groove;

a biasing mechanism biases the first end of the stop bolt against the floor of the longitudinal groove;

an annular groove is provided on an inner surface of the basic member such that the annular groove intersects the longitudinal groove and forms an aperture in the floor of the longitudinal groove;

an axially extending groove is provided on an inner surface of the basic member;

a driving element protrudes from the gearshift rod and is alignable with one of the annular groove and an axially extending grooves, and the driving element is sized and positioned such that when the gearshift rod rotates, the driving element moves within the annular groove, and when the gearshift rod translates, the driving element moves within the axially extending groove;

when the coupling mechanism is in the drive position, the driving element abuts against a wall of the annular groove and the driving element substantially fills the aperture in the floor of the longitudinal groove to prevent the stop bolt from penetrating into the aperture; and when the coupling mechanism is in the slide position, the driving element is aligned with the axial groove, the aperture is aligned with the stop bolt, and the biasing mechanism urges the stop bolt into the aperture such that the first end of the stop bolt abuts against the gearshift rod.

5. A gearshift device according to claim 4, wherein, when the coupling mechanism is in the drive position, the driving element is aligned with the annular groove and the gearshift rod rotates about a predetermined angle, the driving element abuts and urges the stop bolt, through the aperture, away from the gearshift rod against the force of the biasing mechanism.

6. A gearshift device according to claim 5, wherein a pair of driving elements of the gearshift rod are radially offset from one another such that, throughout full rotational and longitudinal movement of the gearshift rod, only one coupling mechanism is in the drive position.

7. A gearshift device according to claim 4, wherein the biasing mechanism is a coil spring which has one end captively retained by the transmission housing and the other end captively retained by an annular keeper provided on the stop bolt.

8. A gearshift device according to claim 7, wherein the driving element is a driving pin.

9. A gearshift device, for gearshift actuation of a multi-speed transmission, comprising:

a transmission housing;

a gearshift rod being slidably and rotatably mounted to the transmission housing and having a longitudinal axis, the gearshift rod being slidable along and rotatable about the longitudinal axis;

a plurality of gearshift mechanisms being movable between a disengaged position and an engaged position;

each of said gearshift mechanisms having a coupling mechanism for coupling the gearshift mechanism to the gearshift rod, each coupling mechanism being adjustable between a slide position and a drive position such that when the coupling mechanism is in the slide position the gearshift rod is slidable relative to the gearshift mechanism, and when the coupling mechanism is in the drive position the gearshift rod is secured to the gearshift mechanism and translational movement of the gearshift rod along the longitudinal axis causes the corresponding gearshift mechanism to move to one of the engaged and disengaged positions; and the gearshift mechanisms being gearshift levers rotatably mounted to the transmission housing about a second axis which is oriented perpendicular to the longitudinal axis of the gearshift rod;

wherein each coupling mechanism comprises:

a cylindrical basic member which is slidably mounted on the gearshift rod and has a center along the longitudinal axis;

a longitudinal groove, with a floor provided therein, is provided on an outer surface of the basic member;

a stop bolt is slidably mounted in the transmission housing and has a first end which abuts against the floor of the longitudinal groove;

a biasing mechanism biases the first end of the stop bolt against the floor of the longitudinal groove;

an annular groove is provided on an inner surface of the basic member such that the annular groove intersects the longitudinal groove and forms an aperture in the floor of the longitudinal groove;

an axially extending groove is provided on an inner surface of the basic member;

a driving element protrudes from the gearshift rod and is alignable with one of the annular groove and the axially extending groove, and the driving element is sized and positioned such that when the gearshift rod rotates the driving element moves within the annular groove, and when the gearshift rod translates the driving element moves within the axially extending groove; and an intermediate joint is located between the basic member and the gearshift lever.

10. A gearshift device according to claim 9, wherein the intermediate joint comprises:

a ball portion extends from the basic member; and a complementary shaped socket portion, to receive the ball portion, is attached to the gearshift level.

11. A gearshift device according to claim 10, wherein the axially extending grooves of the basic members are radially offset from one another such that, throughout full rotational and longitudinal movement of the gearshift rod, only one coupling mechanism is in the drive position.

* * * * *